(12) United States Patent
Nakashima et al.

(10) Patent No.: US 11,655,856 B2
(45) Date of Patent: May 23, 2023

(54) MOTIVE POWER TRANSMISSION DEVICE

(71) Applicant: Mazda Motor Corporation, Hiroshima (JP)

(72) Inventors: Kyosei Nakashima, Aki-gun (JP); Hiroyuki Asakura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 194 days.

(21) Appl. No.: 17/206,483

(22) Filed: Mar. 19, 2021

(65) Prior Publication Data
US 2021/0355998 A1    Nov. 18, 2021

(30) Foreign Application Priority Data
May 18, 2020   (JP) .............................. JP2020-086781

(51) Int. Cl.
*F16F 15/123*    (2006.01)
*F16D 1/10*      (2006.01)
*H02K 7/00*      (2006.01)
*B60K 6/48*      (2007.10)

(52) U.S. Cl.
CPC .......... *F16D 1/101* (2013.01); *F16F 15/1232* (2013.01); *B60K 2006/4825* (2013.01); *F16D 2001/103* (2013.01); *F16D 2300/22* (2013.01); *F16F 2230/0005* (2013.01); *F16F 2232/02* (2013.01); *H02K 7/006* (2013.01); *Y02T 10/62* (2013.01)

(58) Field of Classification Search
CPC .............. F16D 1/101; F16D 2001/103; F16D 2300/22; F16F 15/1232; F16F 2230/0005; F16F 2232/02; B60K 2006/4825; H02K 7/006; Y02T 10/62

USPC .......... 464/66.1; 192/70.17, 70.2; 180/65.26
See application file for complete search history.

(56) References Cited

U.S. PATENT DOCUMENTS

| | | | |
|---|---|---|---|
| 7,992,696 B2 * | 8/2011 | Mahlberg ............ | F16F 15/1442 192/70.17 |
| 10,851,882 B2 * | 12/2020 | Lee ...................... | F16F 15/1232 |
| 2008/0179157 A1 | 7/2008 | Zhou et al. | |

FOREIGN PATENT DOCUMENTS

JP    2008544193 A    12/2008

* cited by examiner

*Primary Examiner* — Greg Binda
(74) *Attorney, Agent, or Firm* — Alleman Hall Creasman & Tuttle LLP

(57) ABSTRACT

A motive power transmission device including first and second motive power transmission members that are spline-fitted together includes a spring retaining member that retains a spring and is mounted on the first motive power transmission member. The spring retaining member includes a temporarily fixing portion that is temporarily fixed to and mounted on the first motive power transmission member in a first compression state of the spring and a locking portion that is locked with the second motive power transmission member in a second compression state where when the first and second motive power transmission members are spline-fitted together, the spring is compressed and urges the second motive power transmission member toward one side in a circumferential direction with respect to the first motive power transmission member.

20 Claims, 15 Drawing Sheets

ENGINE SIDE          OPPOSITE-TO-ENGINE SIDE

MOTIVE POWER TRANSMISSION DEVICE

TECHNICAL FIELD

The present invention relates to a motive power transmission device.

BACKGROUND ART

In a vehicle such as a hybrid vehicle that includes an engine and a motor (drive motor) as drive sources and in which motive power is transmitted from the drive sources to drive wheels via a transmission mechanism, in order to reduce vibration due to a torque fluctuation of the engine, a damper device may be interposed between the motor and the transmission mechanism.

In a case where the damper device is interposed between the motor and the transmission mechanism, there may be a case where a first motive power transmission member and a second motive power transmission member that are rotatably provided in a motive power transmission path from the drive sources to the drive wheels are connected together by spline-fitting, such as a case where a rotor support member of the motor and a connecting member coupled with a drive plate of the damper device are connected together by spline-fitting.

In a case where spline portions of the first motive power transmission member and the second motive power transmission member that are rotatably provided in the motive power transmission path are spline-fitted together as described above, when motive power is not transmitted in a spline-fitting portion between the first motive power transmission member and the second motive power transmission member, gear rattle sounds occur, and noise in a vehicle cabin may be caused.

To handle this, it is possible that a spring is used that relatively urges the second motive power transmission member toward the first motive power transmission member in a circumferential direction, the spline portion of the second motive power transmission member is urged toward the spline portion of the first motive power transmission member in the circumferential direction and is caused to contact therewith, and the gear rattle sound between the first and second motive power transmission members is thereby reduced in the spline-fitting portion between the first motive power transmission member and the second motive power transmission member.

For example, Patent Literature 1 discloses a unit in which a spring retaining member that retains a spring is engaged with a spline portion of a first motive power transmission member and is mounted on the first motive power transmission member, a second motive power transmission member is thereafter spline-fitted to the first motive power transmission member, engagement of the spring retaining member with the spline portion of the first motive power transmission member is released by a spline portion of the second motive power transmission member, and an urging force in a circumferential direction is thereby caused to act between the first motive power transmission member and the second motive power transmission member.

CITATION LIST

Patent Literature

Patent Literature 1: Japanese Translation of PCT International Application Publication No. 2008-544193

SUMMARY OF INVENTION

Problems to be Solved by the Invention

In a unit disclosed in Patent Literature 1, although gear rattle sound in a spline-fitting portion between a first motive power transmission member and a second motive power transmission member can be reduced by a spring urging the second motive power transmission member to the first motive power transmission member in a circumferential direction, a spring retaining member that retains the spring is engaged with spline portions of the first motive power transmission member and the second motive power transmission member.

Thus, shapes of the spline portions of the first motive power transmission member and the second motive power transmission member have to be changed in accordance with the spring retaining member, changes in the shapes of the spline portions may cause complication of a configuration and a cost increase, and it is thus desired to reduce the gear rattle sound without changes in the shapes of the spline portions. Further, in a motive power transmission device in which a first motive power transmission member and a second motive power transmission member are spline-fitted together, it is desired to comparatively easily attach the first motive power transmission member to the second motive power transmission member.

Accordingly, an object of the present invention is to reduce the gear rattle sound between first and second motive power transmission members with high attachability by a comparatively simple configuration without changes in shapes of the spline portions in a motive power transmission device including the first and second motive power transmission members that are spline-fitted together.

Means for Solving the Problems

The present invention provides a motive power transmission device including: a first motive power transmission member and a second motive power transmission member being rotatably provided in a motive power transmission path from a drive source to a drive wheel and being spline-fitted together. The motive power transmission device includes a spring retaining member that retains a spring for urging the second motive power transmission member toward one side in a circumferential direction with respect to the first motive power transmission member and is mounted on the first motive power transmission member. The spring retaining member includes: a temporarily fixing portion that is temporarily fixed to and mounted on the first motive power transmission member in a first compression state where the spring urges the spring retaining member toward the one side in the circumferential direction with respect to the first motive power transmission member; and a locking portion that is locked with the second motive power transmission member in a second compression state where when the first motive power transmission member and the second motive power transmission member are spline-fitted together, the spring is compressed more than the first compression state and urges the second motive power transmission member toward the one side in the circumferential direction with respect to the first motive power transmission member. The first motive power transmission member is provided with a temporarily fixed portion that is temporarily fixed to the temporarily fixing portion, and the second motive power transmission member is provided with a locked portion that is locked with the locking portion.

According to the present invention, the motive power transmission device including the first and second motive power transmission members that are spline-fitted together includes the spring retaining member that retains the spring and is mounted on the first motive power transmission member. The spring retaining member includes the temporarily fixing portion that is temporarily fixed to and mounted on the first motive power transmission member while the spring is in the first compression state, and the first motive power transmission member is provided with the temporarily fixed portion. Accordingly, the spring retaining member can be mounted on the first motive power transmission member by temporarily fixing the temporarily fixing portion to the temporarily fixed portion while the spring is caused to become in the first compression state.

Further, the spring retaining member includes the locking portion that is locked with the second motive power transmission member in the second compression state where the spring is compressed when the first and second motive power transmission members are spline-fitted together, and the second motive power transmission member is provided with the locked portion. Accordingly, when the second motive power transmission member is spline-fitted to the first motive power transmission member on which the spring retaining member is mounted, temporary fixing between the first motive power transmission member and the spring retaining member is released, the locking portion of the spring retaining member is locked with the locked portion of the second motive power transmission member, the second motive power transmission member is urged toward one side in a rotation direction with respect to the first motive power transmission member by the spring, and the gear rattle sound between the first and second motive power transmission members can thereby be reduced.

The spring retaining member is temporarily fixed to and mounted on the first motive power transmission member, the second motive power transmission member is spline-fitted to the first motive power transmission member on which the spring retaining member is mounted, the second motive power transmission member can thereby be urged toward one side in the rotation direction with respect to the first motive power transmission member, and attachment can thus be performed comparatively easily.

Consequently, in the motive power transmission device including the first and second motive power transmission members that are spline-fitted together, the gear rattle sound between the first and second motive power transmission members can be reduced with high attachability by a comparatively simple configuration without changes in shapes of spline portions.

The locking portion and the locked portion are preferably provided on outer sides in a radial direction of a spline-fitting portion between the first motive power transmission member and the second motive power transmission member.

In this configuration, the locking portion of the spring retaining member and the locked portion of the second motive power transmission member are provided on the outer sides in the radial direction of the spline-fitting portion between the first and second motive power transmission members and thus have large dimensions in the radial direction compared to a case where they are provided on inner sides in the radial direction of the spline-fitting portion, and loads can thereby be made small that act on the locking portion and the locked portion when the spline retaining member and the second motive power transmission member are locked together.

The spring retaining member preferably includes an engaging portion that is engaged with the first motive power transmission member in the first and second compression states of the spring and regulates movement in an axial direction toward an opposite side to a first motive power transmission member side.

In this configuration, because the spring retaining member includes the engaging portion that is engaged with the first motive power transmission member in the first and second compression states of the spring and regulates movement in the axial direction toward the opposite side to the first motive power transmission member side, the spring retaining member temporarily fixed to and mounted on the first motive power transmission member can be inhibited from moving toward the opposite side to the first motive power transmission member side and from being detached from the first motive power transmission member.

The first motive power transmission member may be a motor as the drive source, and the second motive power transmission member may be a damper device connected with the motor.

In this configuration, the first motive power transmission member is the motor as the drive source, and the second motive power transmission member is the damper device connected with the motor. Accordingly, in a case where a configuration member of the motor and a configuration member of the damper device are spline-fitted together, the gear rattle sound between the configuration member of the motor and the configuration member of the damper device can be reduced with high attachability.

The motor may include a rotor support member supporting a rotor, the rotor support member may be provided with the temporarily fixed portion, and the spring retaining member may be mounted on the rotor support member.

In this configuration, because the rotor support member is provided with the temporarily fixed portion and the spring retaining member is mounted on the rotor support member, the spring retaining member can be temporarily fixed to and mounted on the rotor support member comparatively easily.

The spring retaining member may include an annular body that retains the spring and is formed into an annular shape. The temporarily fixing portion may be composed of a circumferential-direction extended portion extending from the annular body toward the one side in the circumferential direction in a cantilever shape, and the temporarily fixed portion may be composed of a circumferential-direction recess being recessed from a spring retaining member side toward an opposite side to the spring retaining member side and extending in the circumferential direction.

In this configuration, because the temporarily fixing portion of the spring retaining member is composed of the circumferential-direction extended portion extending from the annular body toward one side in the circumferential direction and the temporarily fixed portion of the first motive power transmission member is composed of the circumferential-direction recess that is recessed from the spring retaining member side toward the opposite side to the spring retaining member side, without using the spline portions of the first and second motive power transmission members and by a comparatively simple configuration, the circumferential-direction extended portion is temporarily fixed to the circumferential-direction recess while the spring is caused to become in the first compression state, and the spring retaining member can thereby be mounted on the first motive power transmission member.

The locking portion may be composed of an axial-direction extended portion extending from the annular body of the spring retaining member toward a second motive power transmission member side in an axial direction, and the locked portion may be composed of a projection portion projecting toward a first motive power transmission member side in the axial direction.

In this configuration, because the locking portion of the spring retaining member is composed of the axial-direction extended portion extending from the annular body toward the second motive power transmission member side and the locked portion of the second motive power transmission member is composed of the projection portion projecting toward the first motive power transmission member side, without using the spline portions of the first and second motive power transmission members and by a comparatively simple configuration, the axial-direction extended portion of the spring retaining member is locked with the projection portion of the second motive power transmission member while the spring is caused to become in the second compression state, and the second motive power transmission member can thereby be urged toward one side in the rotation direction with respect to the first motive power transmission member.

The locking portion preferably includes a guide portion that guides the locking portion to be locked with the locked portion.

In this configuration, because the locking portion of the spring retaining member includes the guide portion that guides the locking portion to be locked with the locked portion of the second motive power transmission member, the locking portion of the spring retaining member can comparatively easily be locked with the locked portion of the second motive power transmission member by the guide portion.

Advantageous Effect of Invention

According to the present invention, in a motive power transmission device including first and second motive power transmission members that are spline-fitted together, gear rattle sound between the first and second motive power transmission members can be reduced with high attachability by a comparatively simple configuration without changes in shapes of spline portions.

Mode for Carrying out the Invention

An embodiment of the present invention will hereinafter be described with reference to the attached drawings.

Figure 1:
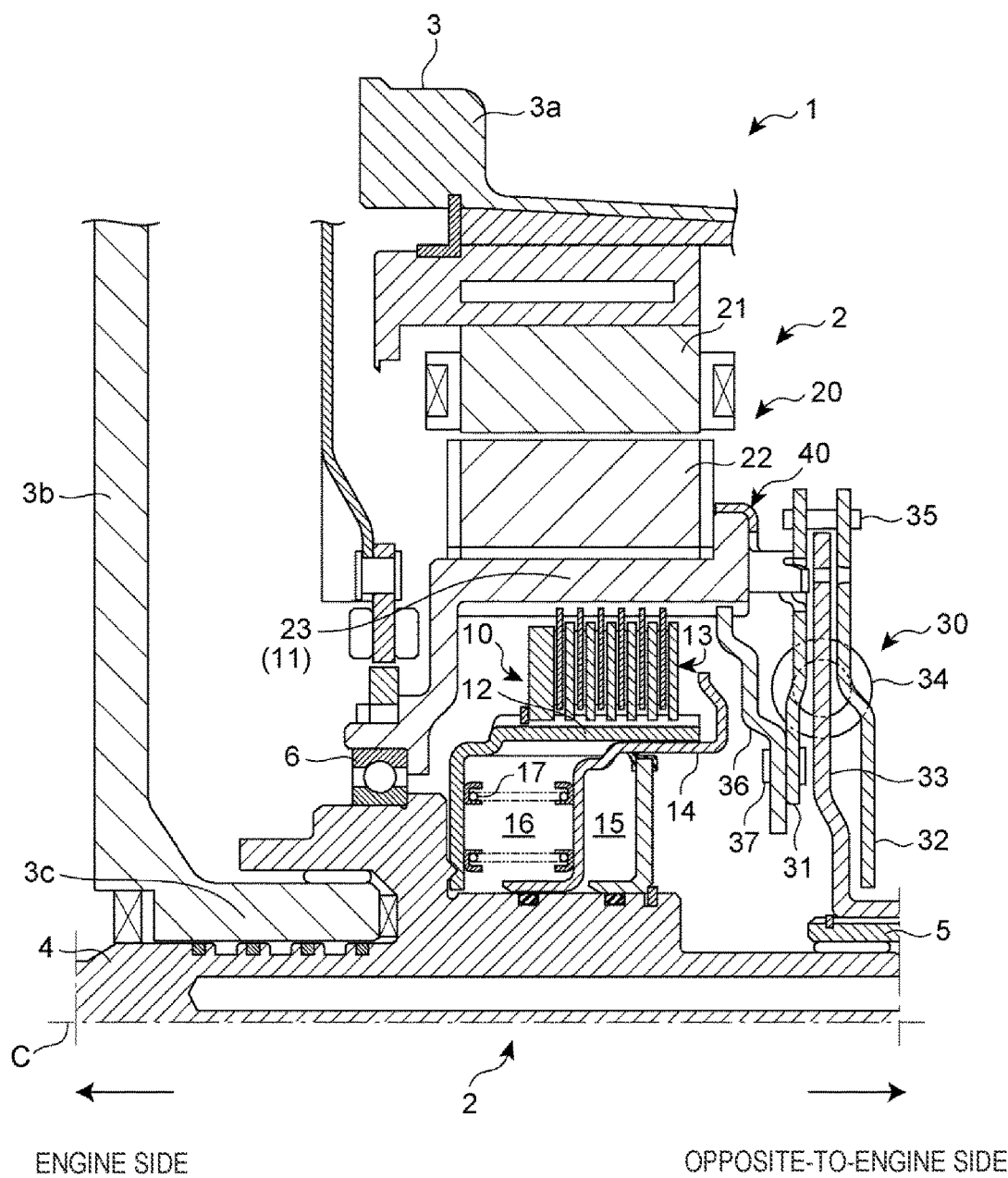
FIG. 1 is a cross-sectional view illustrating a drive unit of an automatic transmission including a motive power transmission device according to an embodiment of the present invention.

FIG. 1 is a cross-sectional view illustrating a drive unit of an automatic transmission including a motive power transmission device according to the embodiment of the present invention. As illustrated in FIG. 1, an automatic transmission 1 including the motive power transmission device according to the embodiment of the present invention is installed in a hybrid vehicle including an engine and a motor as drive sources. The automatic transmission 1 includes a drive unit 2 provided in a motive power transmission path from the drive sources to drive wheels, connected with an output shaft of the engine, and including a motor and a transmission mechanism connected with the drive unit 2 and having a plurality of friction fastening elements such as a plurality of planetary gear sets (planetary gear mechanisms), a clutch, and a brake.

The transmission mechanism is configured to selectively fasten the plurality of friction fastening elements, thereby switch motive power transmission paths via the plurality of planetary gear sets, and achieve a predetermined shift stage corresponding to an operational state of a vehicle. In the vehicle in which the automatic transmission 1 is installed, motive power from the transmission mechanism is transmitted to the drive wheels.

In the automatic transmission 1, the drive unit 2 and the transmission mechanism are housed in a transmission casing 3 and arranged to be aligned in the same axial line C as the output shaft of the engine. The drive unit 2 is arranged on the engine side, and the transmission mechanism is arranged on an opposite-to-engine side.

The drive unit 2 includes a drive unit input shaft 4 which is connected with the output shaft of the engine and to which the motive power from the engine is transmitted, a drive unit output shaft 5 connected with the transmission mechanism and transmitting the motive power from the drive unit 2 to the transmission mechanism, a clutch 10 configured to be capable of connection and disconnection between the drive unit input shaft 4 and the drive unit output shaft 5, and a motor 20.

The drive unit input shaft 4 and the drive unit output shaft 5 are rotatably provided in the same axial line C, and the drive unit output shaft 5 is arranged on the opposite-to-engine side of the drive unit input shaft 4. On the engine side of the transmission casing 3, a raised wall 3b is provided that extends inward in a radial direction from an outer peripheral portion 3a of the transmission casing 3, and a boss portion 3c is provided that extends along the axial line C from an inner peripheral portion of the raised wall 3b toward the opposite-to-engine side. The drive unit input shaft 4 is rotatably supported on an inner peripheral side of the boss portion 3c.

The clutch 10 has a clutch drum 11 as an outside rotation member, a clutch hub 12 as an inside rotation member, a plurality of friction plates 13 that are arranged to be aligned in an axial direction between the clutch drum 11 and the clutch hub 12 and are alternately engaged with the clutch drum 11 and the clutch hub 12, a piston 14 arranged on the opposite-to-engine side of the plurality of friction plates 13 and pressing the plurality of friction plates 13, and a hydraulic chamber 15 to which hydraulic oil urging the piston 14 in a friction plate direction is supplied.

On the opposite side to the hydraulic chamber 15 across the piston 14, a centrifugal cancellation chamber 16 is provided to which the hydraulic oil urging the piston 14 in the opposite direction to the friction plates is supplied. In the centrifugal cancellation chamber 16, a return spring 17 is disposed that urges the piston 14 in the opposite direction to the friction plates.

When the hydraulic oil is supplied to the hydraulic chamber 15 and a hydraulic pressure is supplied, the piston 14 presses the friction plates 13, the clutch drum 11 and the clutch hub 12 are coupled together, and the clutch 10 is thereby fastened. Further, the clutch 10 is formed to be released when the hydraulic pressure is discharged from the hydraulic chamber 15.

The clutch drum 11 is connected with the drive unit output shaft 5 via a damper device 30, and the clutch hub 12 is coupled with the drive unit input shaft 4. In the drive unit 2, the clutch 10 is fastened, the drive unit input shaft 4 and the drive unit output shaft 5 are thereby connected together via the damper device 30. The clutch 10 is released, and connection between the drive unit input shaft 4 and the drive unit output shaft 5 is thereby disconnected.

The motor 20 is arranged on an outer peripheral side of the clutch 10. The motor 20 has a stator 21 fixed to the outer peripheral portion 3a of the transmission casing 3, a rotor 22 arranged on an inner side of the stator 21 in a radial direction, and a rotor support member 23 fixed to an inner peripheral surface of the rotor 22 and supporting the rotor 22. The rotor support member 23 is integrally formed with the clutch drum 11, the plurality of friction plates 13 are engaged with an inner peripheral surface, and the rotor 22 is fixed to an outer peripheral surface. The rotor support member 23 is supported by a bearing 6 rotatably with respect to the drive unit input shaft 4.

The stator 21 is configured by winding a coil around a stator core formed of a magnetic material. The rotor 22 is composed of a tubular magnetic material. The motor 20 is formed such that the rotor 22 rotates by a magnetic force generated in the stator 21 when electric power is supplied to the stator 21. The motive power from the motor 20 is transmitted to the drive unit output shaft 5 via the damper device 30.

The damper device 30 is interposed between the motor 20 and the transmission mechanism in order to reduce vibration due to a torque fluctuation of the engine and is connected with the motor 20, specifically, the rotor support member 23. The damper device 30 has a drive plate 31 to which the motive power from the drive source is input via the rotor support member 23, a cover plate 32 arranged on the opposite-to-engine side of the drive plate 31 and fastened and fixed to the drive plate 31 by rivets 35, and a driven plate 33 arranged between the drive plate 31 and the cover plate 32.

Each of the drive plate 31, the cover plate 32, and the driven plate 33 extends in an orthogonal direction to an axial center C and is formed into a disc shape. The drive plate 31 and the driven plate 33 are provided to be capable of relative rotation and are connected together to be capable of transmitting rotation via springs 34 arranged in a plurality of parts in a circumferential direction along the circumferential direction.

In the damper device 30, the motive power is transmitted from the drive plate 31 to the driven plate 33 via the springs 34, and a torque fluctuation of the engine is reduced by compression of the springs 34. Although not illustrated, in the driven plate 33, a plurality of protrusions protruding toward the drive plate side are dispersedly provided in the circumferential direction, disc springs are arranged on the driven plate side between the driven plate 33 and the cover plate 32, and the driven plate 33 is retained in a predetermined position in the axial direction.

An inner peripheral surface of the driven plate 33 is spline-fitted to a front end portion of the drive unit output shaft 5, and the motive power from the drive source is thereby transmitted to the transmission mechanism. Meanwhile, as for the drive plate 31, a connecting member 36 connected with the motor 20, specifically, the rotor support member 23 is coupled with an inner peripheral side by fastening and fixing those together by rivets 37, and the motive power from the drive source is thereby transmitted.

The connecting member 36 extends in an orthogonal direction to the axial center C and is formed into a disc shape. An outer peripheral side of the connecting member 36 is provided on the engine side compared to an inner peripheral side, and the outer peripheral side is spline-fitted to the rotor support member 23.

In the vehicle in which the automatic transmission 1 is installed, the motive power from at least either one of the engine and the motor 20 is transmitted to the transmission mechanism when the clutch 10 is fastened, the motive power from the motor 20 is transmitted to the transmission mechanism when the clutch 10 is released, and the motive power from the drive source is thereby transmitted to the drive wheels via the transmission mechanism.

In this embodiment, in order to reduce gear rattle sound in a spline-fitting portion between the rotor support member 23 of the motor 20 and the drive plate 31 of the damper device 30, specifically, the connecting member 36 connected with the drive plate 31, a spring retaining member 40 is mounted on the rotor support member 23. In the spring retaining member 40, springs are retained that relatively urge the connecting member 36 toward one side in a circumferential direction with respect to the rotor support member 23.

When the connecting member 36 included in the damper device 30 is splined-fitted to the rotor support member 23 on which the spring retaining member 40 is mounted, the springs retained by the spring retaining member 40 are compressed, and an urging force toward one side in the circumferential direction is thereby caused to act on the spline-fitting portion to the connecting member 36.

Figure 2:
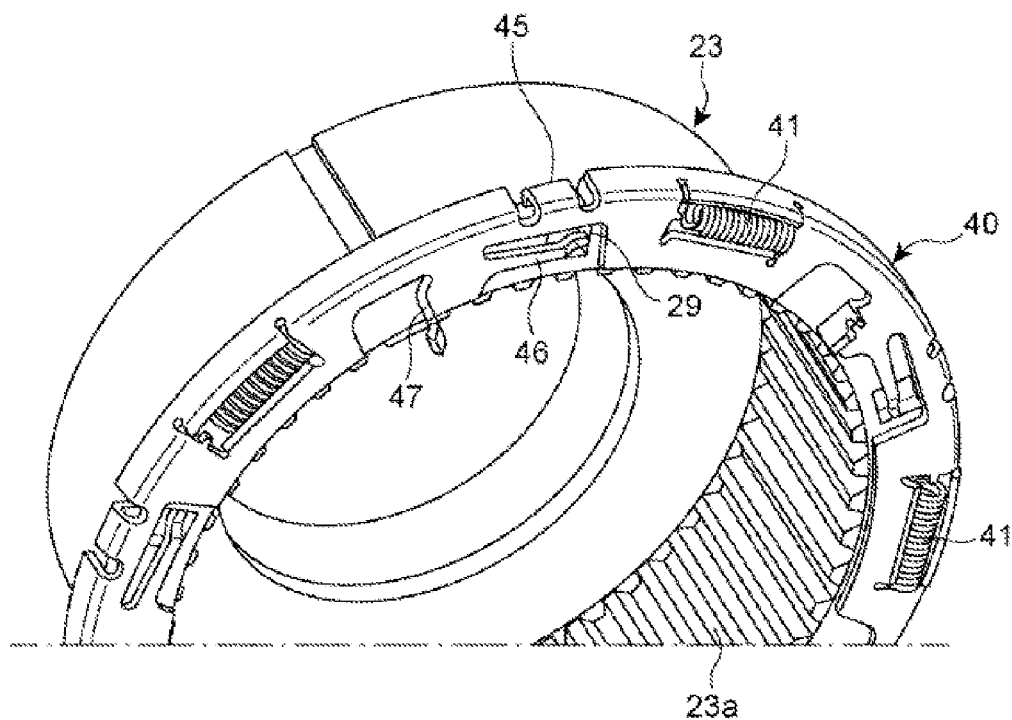
FIG. 2 is a perspective view illustrating a rotor support member to which a spring retaining member is mounted.

FIG. 2 is a perspective view illustrating the rotor support member to which the spring retaining member is mounted. As illustrated in FIG. 2, a spline portion 23a is formed in the inner peripheral surface of the rotor support member 23. In the rotor support member 23, the spring retaining member 40 retaining springs 41 for urging the connecting member 36 toward one side in the circumferential direction with respect to the rotor support member 23 is mounted on the opposite-to-engine side.

Figure 3:
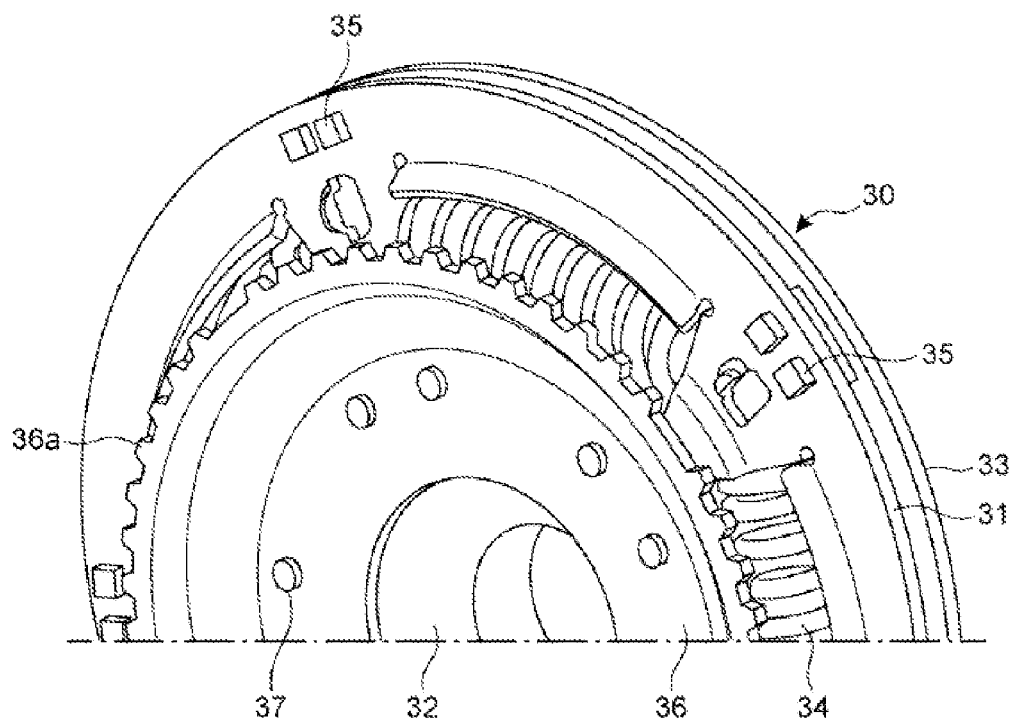
FIG. 3 is a perspective view illustrating a damper device including a connecting member.

FIG. 3 is a perspective view illustrating the damper device including the connecting member. As illustrated in FIG. 3, in the damper device 30, a spline portion 36a is formed on an outer peripheral surface of the connecting member 36 coupled with the engine side of the drive plate 31. When the connecting member 36 is spline-fitted to the rotor support member 23 from the opposite-to-engine side, the springs 41 are compressed, and an urging force toward one side in the circumferential direction is thereby caused to act on the spline-fitting portion between the rotor support member 23 and the connecting member 36.

A detailed description will be made about attachment of the rotor support member 23 on which the spring retaining member 40 is mounted to the damper device 30 including the connecting member 36. Although an explanation will not be made in the following, the clutch 10 is attached to the rotor support member 23 before attaching to the damper device 30.

Figure 4:
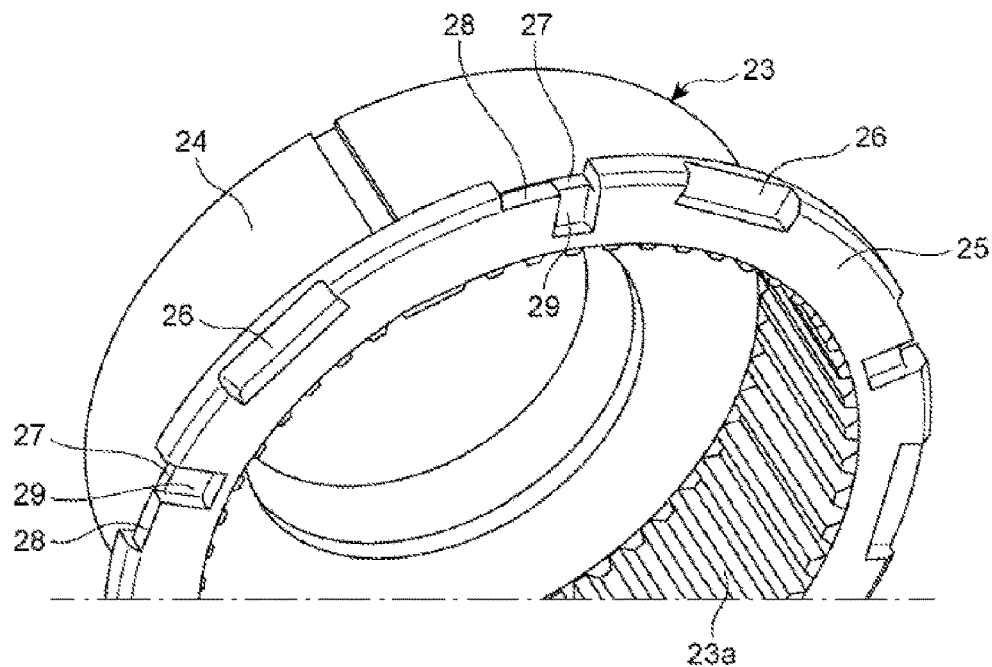
FIG. 4 is a perspective view of the rotor support member.
Figure 5:
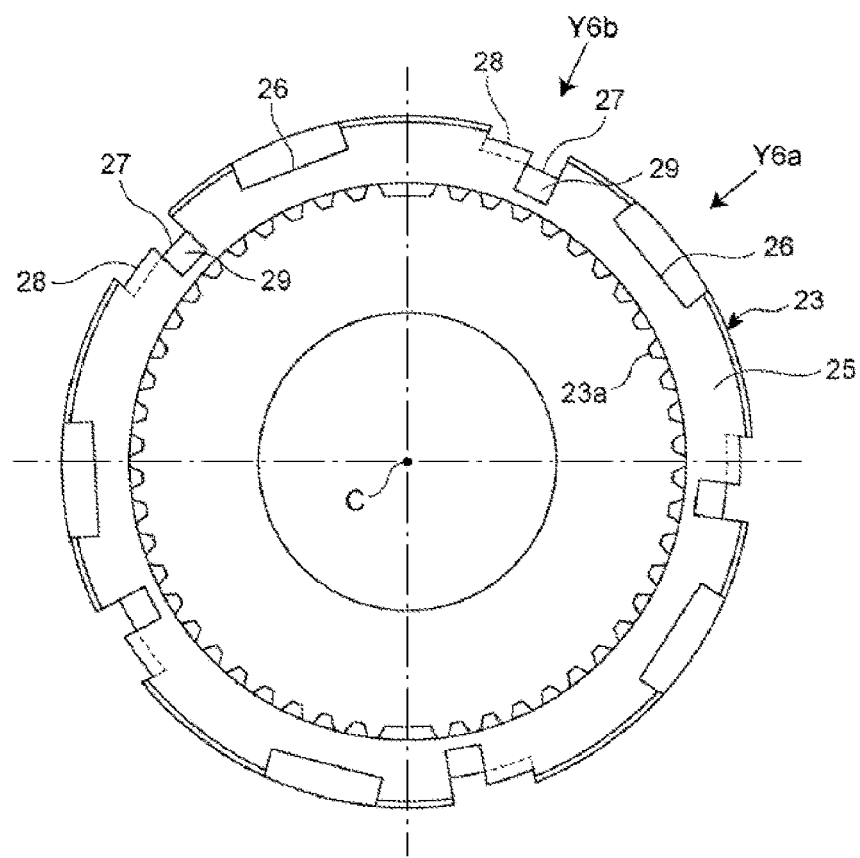
FIG. 5 is a front view of the rotor support member.
Figure 6A:
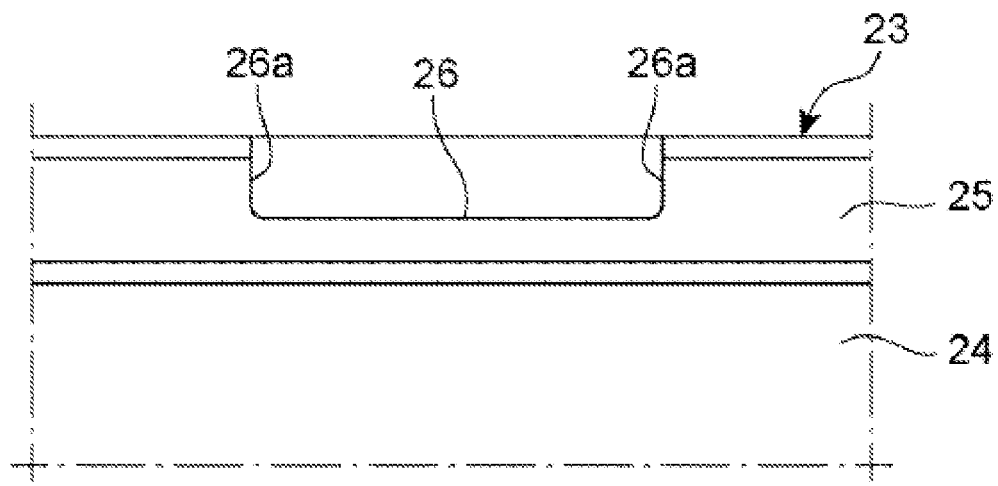
FIGS. 6A and 6B are side views of the rotor support member.
Figure 6B:
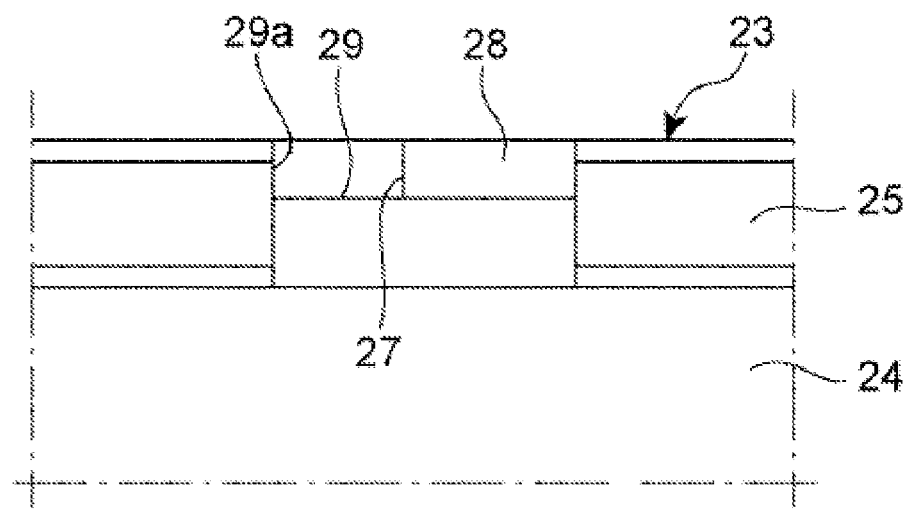

FIG. 4 is a perspective view of the rotor support member, and FIG. 5 is a front view of the rotor support member. FIG. 6A and FIG. 6B are respective side views of the rotor support member as seen from Y6a and Y6b directions in FIG. 5. As illustrated in FIG. 4 to FIG. 6B, the rotor support member 23 includes a cylindrical portion 24 extending in the axial direction in a generally cylindrical shape and a flange portion 25 extending outward in a radial direction from an opposite-to-engine side of the cylindrical portion 24, extending in an orthogonal direction to the axial direction, and formed into an annular shape in a generally circular shape.

In the cylindrical portion 24 of the rotor support member 23, the spline portion 23a is formed that has splines, whose tooth traces extend in the axial direction, in an inner peripheral surface. In the spline portion 23a of the rotor support member 23, the plurality of friction plates 13 configuring the clutch 10 are engaged on an engine side, and the connecting member 36 included in the damper device 30 is spline-fitted on the opposite-to-engine side.

The rotor 22 is fixed to and mounted on an outer peripheral surface of the cylindrical portion 24 of the rotor support member 23. In this embodiment, the rotor 22 is fixed to and mounted on the rotor support member 23 after the rotor support member 23 and the connecting member 36 are spline-fitted together. It is possible to spline-fit the rotor support member 23 and the connecting member 36 together after the rotor 22 is fixed to and mounted on the rotor support member 23.

In the flange portion 25 of the rotor support member 23, the spring retaining member 40 is mounted on the opposite-to-engine side. In the flange portion 25, a plurality of spring accommodation portions 26 recessed toward the engine side in generally rectangular shapes along the circumferential direction are formed in an end surface on the opposite-to-engine side.

When the spring retaining member 40 is mounted on the rotor support member 23, the spring 41 is accommodated in a spring accommodation portion 26 together with the spring retaining member 40, and both end portions of the spring 41 are retained by both end portions 26a of the spring accommodation portion 26 in the circumferential direction. In the rotor support member 23, five spring accommodation portions 26 are dispersedly formed in the circumferential direction.

In the flange portion 25 of the rotor support member 23, notch portions 27 are formed that are notched from the opposite-to-engine side toward the engine side and notched inward in a radial direction from an outer peripheral side in generally rectangular shapes. The notch portion 27 is formed through which an engaging portion 45, of the spring retaining member 40, described later is capable of passing.

Further, in the flange portion 25, engaged portions 28 are formed that are engaged with the engaging portions 45 of the spring retaining member 40 in the axial direction. The engaged portion 28 is provided adjacently to the notch portion 27 in the circumferential direction and extends in the radial direction toward an outer side in the radial direction of an inner surface of the notch portion 27 in the radial direction. When the engaging portions 45 of the spring retaining member 40 are rotated in the circumferential direction, the engaged portions 28 are engaged with the engaging portions 45 of the spring retaining member 40 and thereby regulate movement of the spring retaining member 40 in the axial direction toward the engine side as an opposite-to-rotor-support-member side.

Further, the flange portion 25 is provided with temporarily fixed portions 29 that are temporarily fixed to temporarily fixing portions 46, of the spring retaining member 40, described later. The temporarily fixed portions 29 are substantially identical and therefore a single representative temporarily fixed portion 29 will be described in detail, and the temporarily fixed portions 29 are treated similarly. The temporarily fixed portion 29 is composed of a circumferential-direction recess recessed from the opposite-to-engine side toward the engine side of the rotor support member 23 and extending in the circumferential direction. In this embodiment, the circumferential-direction recess (temporarily fixed portion 29) is arranged on an inner side of the notch portion 27 in the radial direction, and a side face 29a of the circumferential-direction recess (temporarily fixed portion 29) on one side in the circumferential direction is formed with a flat surface linearly extending from the axial center C in the radial direction.

As illustrated in FIG. 5, in the flange portion 25 of the rotor support member 23, the notch portion 27, the engaged portion 28, and the temporarily fixed portion 29 are adjacently formed, and five sets of the notch portion 27, the engaged portion 28, and the temporarily fixed portion 29 that are adjacently formed are dispersedly formed in the circumferential direction.

Figure 7:
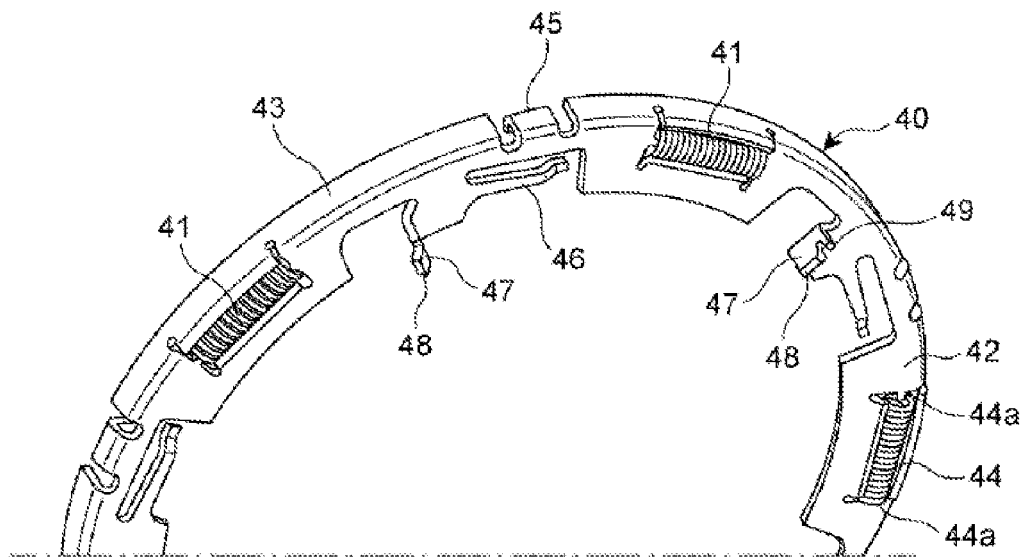
FIG. 7 is a perspective view illustrating the spring retaining member in which springs are retained.
Figure 8:
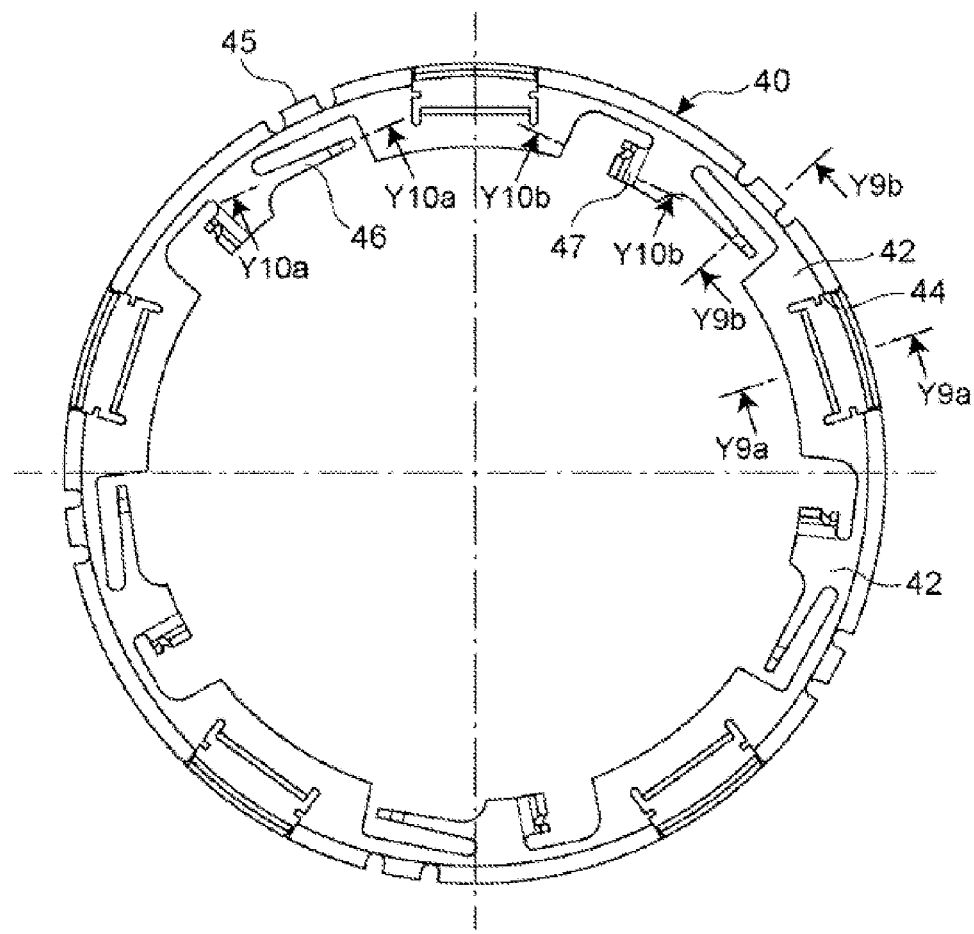
FIG. 8 is a front view of the spring retaining member.
Figure 9A:
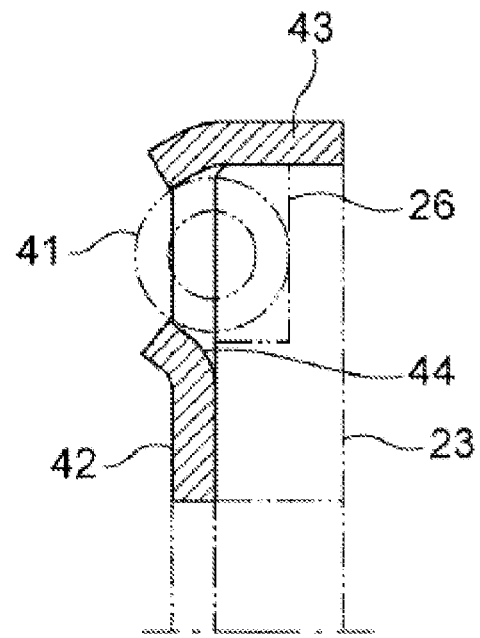
FIGS. 9A and 9B are cross-sectional views of the spring retaining member.
Figure 9B:
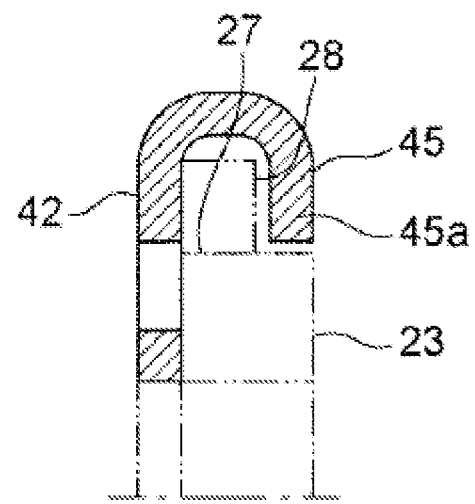
Figure 10A:
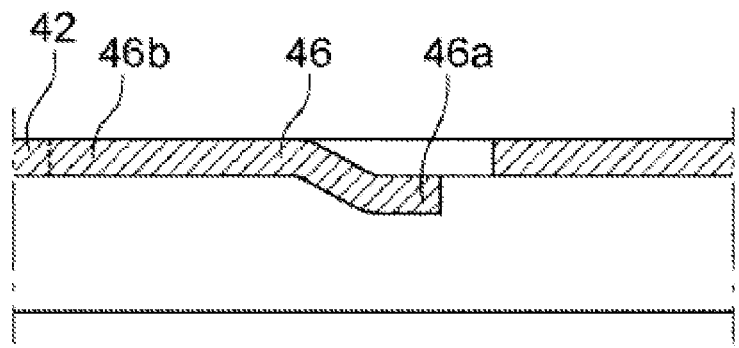
FIGS. 10A and 10B are additional cross-sectional views of the spring retaining member.
Figure 10B:
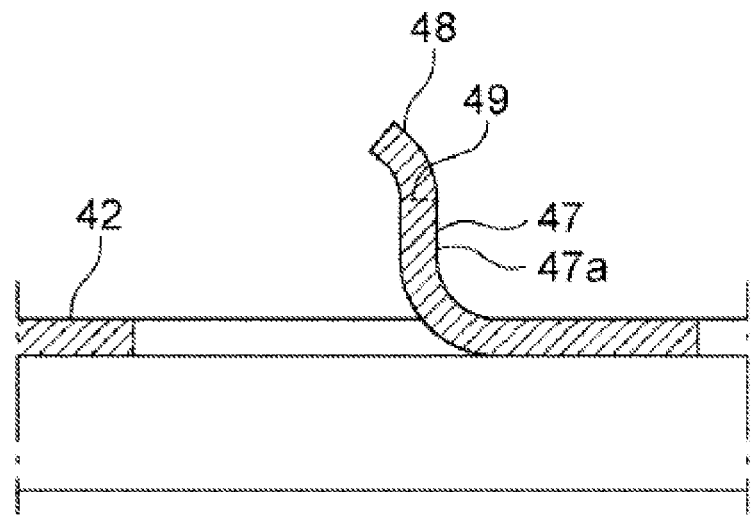

FIG. 7 is a perspective view of the spring retaining member in which the springs are retained, and FIG. 8 is a front view of the spring retaining member. FIG. 9A and FIG. 9B are respective cross-sectional views of the spring retaining member taken along line Y9a-Y9a and line Y9b-Y9b in FIG. 8. FIG. 10A and FIG. 10B are respective cross-sectional views of the spring retaining member taken along line Y10a-Y10a and line Y10b-Y10b in FIG. 8.

As illustrated in FIG. 7 to FIG. 10B, the spring retaining member 40 includes an annular body 42 formed with a plate-shaped member, formed into an annular shape in a generally circular shape, and extending in an orthogonal direction to the axial direction. The annular body 42 is provided with a flange portion 43 extending from an outer peripheral side toward the engine side in the axial direction in a generally cylindrical shape.

The annular body 42 of the spring retaining member 40 is formed into generally the same shape corresponding to the flange portion 25 of the rotor support member 23 when seen from the axial direction. The annular body 42 is combined with the flange portion 25 of the rotor support member 23, the flange portion 43 is fitted to the outer peripheral side of the flange portion 25 of the rotor support member 23, and the spring retaining member 40 is thereby mounted on the rotor support member 23.

In the annular body 42, a plurality of spring accommodation portions 44 opened in generally rectangular shapes are formed along a circumferential direction. As illustrated in FIG. 9A, when the spring retaining member 40 is mounted on the rotor support member 23, the spring 41 is accommodated in the spring accommodation portion 44 together with the rotor support member 23, and both end portions of the spring 41 are retained by both end portions 44a of the spring accommodation portion 44 in the circumferential direction. In the spring retaining member 40, five spring accommodation portions 44 are dispersedly formed in the circumferential direction.

Further, in the annular body 42, in a portion in which the flange portion 43 is notched in the circumferential direction, as illustrated in FIG. 9B, the engaging portion 45 is formed that extends from the outer peripheral side of the annular body 42 toward the engine side in the axial direction in a generally rectangular shape and then extending inward in a radial direction in a generally rectangular shape.

A distal end portion 45a of the engaging portion 45 is formed so as to pass through the notch portion 27 of the rotor support member 23 when the spring retaining member 40 and the rotor support member 23 are fitted together and so as to be opposed to the engaged portion 28 of the rotor support member 23 in the axial direction when the spring retaining member 40 is rotated toward the other side in the circumferential direction with respect to the rotor support member 23.

When the spring retaining member 40 is moved toward the opposite-to-rotor-support-member side that is the opposite side to the rotor support member side, the engaging portion 45 of the spring retaining member 40 is engaged with the rotor support member 23, and movement toward the opposite-to-rotor-support-member side in the axial direction is thereby regulated. In the spring retaining member 40, five engaging portions 45 are dispersedly formed in the circumferential direction. Each of the notch portion 27 and the engaged portion 28 of the rotor support member 23 is formed to correspond to the engaging portion 45 of the spring retaining member 40.

Further, in the annular body 42, a temporarily fixing portion 46 is provided that is temporarily fixed to and mounted on the rotor support member 23 in a first compression state where the respective spring 41 relatively urges the spring retaining member 40 toward one side in the circumferential direction with respect to the rotor support member 23.

The temporarily fixing portion 46 of the spring retaining member 40 is composed, in a notched portion on an inner peripheral side of the annular body 42, of a circumferential-direction extended portion extending from the annular body 42 toward one side in the circumferential direction in a cantilever shape. As illustrated in FIG. 10A, in the circumferential-direction extended portion (temporarily fixing portion 46), a base end side 46b as the annular body side is formed to be generally flush with the annular body 42, a distal end side 46a is provided further on the engine side of the annular body 42, and the distal end side is formed to be capable of being displaced in the axial direction.

As illustrated in FIG. 8, the circumferential-direction extended portion (temporarily fixing portion 46) is formed such that when the engaging portion 45 of the spring retaining member 40 passes through the notch portion 27 of the rotor support member 23 and the spring retaining member 40 is combined with the rotor support member 23, the base end side is positioned further on the other side in the circumferential direction of an end portion of the engaging portion 45 on the other side in the circumferential direction, and the distal end side is positioned further on one side in the circumferential direction of an end portion of the engaging portion 45 on one side in the circumferential direction.

The circumferential-direction extended portion (temporarily fixing portion 46) is formed such that when the engaging portion 45 of the spring retaining member 40 passes through the notch portion 27 of the rotor support member 23 and the spring retaining member 40 is combined with the rotor support member 23, a distal end side of the temporarily fixing portion 46 is positioned further on one side in the circumferential direction of the circumferential-direction recess (temporarily fixed portion 29) of the rotor support member 23.

Moreover, in the circumferential-direction extended portion (temporarily fixing portion 46), when the spring retaining member 40 is rotated by a predetermined angle toward the other side in the circumferential direction with respect to the rotor support member 23, the distal end side is elastically displaced toward the engine side in the axial direction, contacts with the side face 29a on one side in the circumferential direction of the circumferential-direction recess (temporarily fixed portion 29), and is temporarily fixed to the circumferential-direction recess.

The spring 41 is caused to become in the first compression state where the spring 41 is compressed by the end portion 26a on the other side in the circumferential direction of the spring accommodation portion 26 of the rotor support member 23 and the end portion 44a on one side in the circumferential direction of the spring accommodation portion 44 of the spring retaining member 40 and relatively urges the spring retaining member 40 toward one side in the circumferential direction with respect to the rotor support member 23.

The temporarily fixing portions 46 are temporarily fixed to the temporarily fixed portions 29 of the rotor support member 23, and the spring retaining member 40 is thereby temporarily fixed to and mounted on the rotor support member 23 in the first compression state where the springs 41 urge the spring retaining member 40 toward one side in the circumferential direction with respect to the rotor support member 23. In the spring retaining member 40, five temporarily fixing portions 46 are dispersedly formed in the circumferential direction. The temporarily fixed portions 29 of the rotor support member 23 are formed to correspond to the temporarily fixing portions 46 of the spring retaining member 40.

Further, the annular body 42 is provided with locking portions 47 that are locked with the drive plate 31 in a second compression state where when the rotor support member 23 and the drive plate 31, specifically, the connecting member 36 coupled with the drive plate 31 are spline-fitted together, the springs 41 are compressed more than the first compression state and relatively urge the spring retaining member 40 toward one side in the circumferential direction with respect to the rotor support member 23.

As illustrated in FIG. 10B, the locking portion 47 of the spring retaining member 40 is composed of an axial-direction extended portion 47 extending in an orthogonal direction to the annular body 42 while having a predetermined width in the radial direction and extending from the annular body 42 toward the drive plate side as the opposite-to-engine side in the axial direction.

The axial-direction extended portion 47 is arranged on the other side in the circumferential direction of the circumferential-direction extended portion (temporarily fixing portion 46), and one side 47a in the circumferential direction of the axial-direction extended portion 47 is formed with a flat surface linearly extending from the axial center C in the radial direction. The axial-direction extended portion 47 is locked with a locked portion 38 of the drive plate 31 described later.

The locking portion 47 of the spring retaining member 40 is provided with a guide portion 48 that guides the locking portion 47 to be locked with the locked portion 38 provided to the drive plate 31. The guide portion 48 is provided on an inner side in the radial direction in a distal end side of the axial-direction extended portion 47 and extends while being inclined in a curved shape toward the other side in the circumferential direction as it goes toward the drive plate side as the opposite-to-engine side.

When the spline portion 36a of the connecting member 36 coupled with the drive plate 31 is spline-fitted to the spline portion 23a of the rotor support member 23 on which the spring retaining member 40 is mounted, the rotor support member 23 and the connecting member 36 are spline-fitted together while the guide portions 48 of the spring retaining member 40 are arranged in positions in which those overlap with projection portions (locked portions 38) of the drive plate 31 in the circumferential direction.

In a case where the connecting member 36 is spline-fitted to the rotor support member 23, when the guide portion 48 of the spring retaining member 40 contacts with the projection portion (locked portion 38) of the drive plate 31, the projection portion is guided to the locking portion 47 by the guide portion 48, the spring retaining member 40 is rotated by a predetermined angle toward the other side in the circumferential direction with respect to the rotor support member 23, and the locking portion 47 of the spring retaining member 40 is locked with the projection portion of the drive plate 31.

When the projection portion (locked portion 38) is guided to the locking portion 47 by the guide portion 48 of the spring retaining member 40, the spring retaining member 40 is rotated by the predetermined angle toward the other side in the circumferential direction with respect to the rotor support member 23 before the locking portion 47 is locked with the projection portion, and temporary fixing between the rotor support member 23 and the spring retaining member 40 is thereby released.

Tooth surfaces of the spline portion 23a of the rotor support member 23 on the other side in the circumferential direction contact with tooth surfaces of the spline portion 36a of the connecting member 36 on one side in the circumferential direction before the locking portions 47 are locked with the projection portions (locked portions 38) of the drive plate 31, the temporary fixing between the rotor support member 23 and the spring retaining member 40 is thereafter released, and an urging force toward one side in the circumferential direction is caused to act between the spline portion 23a of the rotor support member 23 and the spline portion 36a of the connecting member 36 by the springs 41.

The spring 41 is caused to become the second compression state where the spring 41 is compressed more than the first compression state by the end portion 26a on the other side in the circumferential direction of the spring accommodation portion 26 of the rotor support member 23 and the end portion 44a on one side in the circumferential direction of the spring accommodation portion 44 of the spring retaining member 40 and urges the spring retaining member 40 toward one side in the circumferential direction with respect to the rotor support member 23.

The locking portion 47 of the spring retaining member 40 is provided with a stopper portion 49 that regulates movement of the drive plate 31 in the axial direction toward the rotor support member side when the connecting member 36 is spline-fitted to the rotor support member 23. As illustrated in FIG. 7, the stopper portion 49 is provided on an outer side in the radial direction on the distal end side of the axial-direction extended portion 47 and is formed with a flat surface extending in an orthogonal direction to the axial direction.

Figure 11:
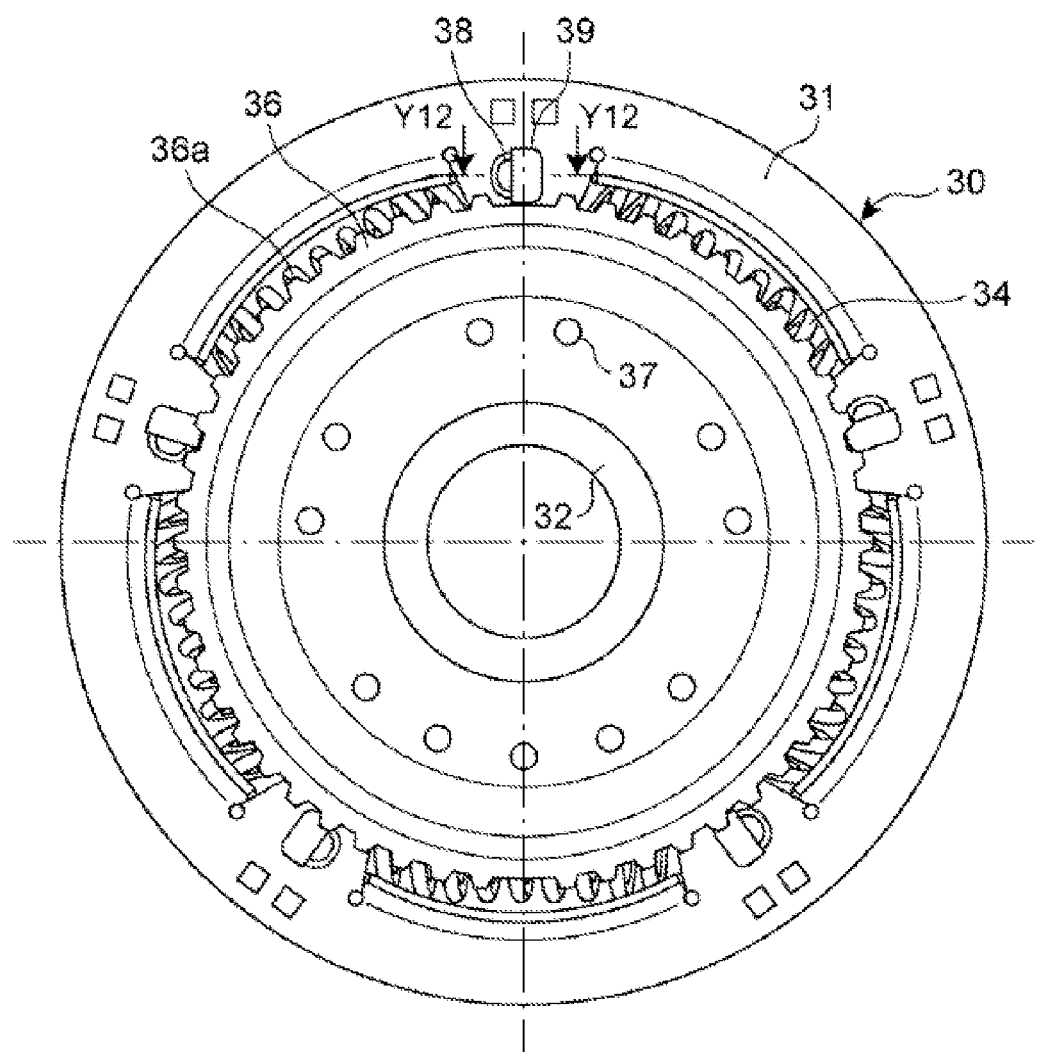
FIG. 11 is a front view of a damper device including a connecting member.
Figure 12:
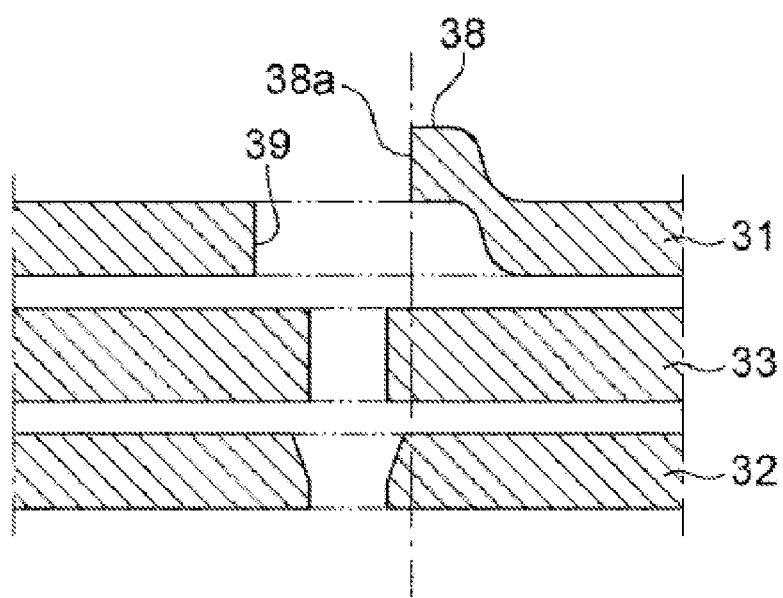
FIG. 12 is a cross-sectional view of the damper device taken along line Y12-Y12 in FIG. 11.

When the connecting member 36 is spline-fitted to the rotor support member 23, the drive plate 31 is moved in the axial direction toward the rotor support member side until it abuts the stopper portions 49 of the spring retaining member 40 mounted on the rotor support member FIG. 11 is a front view of the damper device including the connecting member, and FIG. 12 is a cross-sectional view of the damper device taken along line Y12-Y12 in FIG. 11. As illustrated in FIG. 11 and FIG. 12, the damper device 30, specifically, the drive plate 31 is provided with the locked portions 38 that are locked with the locking portions 47 of the rotor support member 23.

Each locked portion 38 of the drive plate 31 is composed of the projection portion 38 projecting toward the rotor support member side in the axial direction. The projection portion (locked portion 38) is formed with a flat surface that projects in the axial direction in a semi-circular shape and whose end surface 38a on the other side in the circumferential direction linearly extends from the axial center C in the radial direction.

The projection portions (locked portions 38) of the drive plate 31 are formed such that when the spline portion 36a of the connecting member 36 coupled with the drive plate 31 is spline-fitted to the spline portion 23a of the rotor support member 23 on which the spring retaining member 40 is mounted, the guide portions 48 of the spring retaining member 40 are positioned so as to overlap with the projection portions (locked portions 38) of the drive plate 31 in the circumferential direction.

When the connecting member 36 is spline-fitted to the rotor support member 23, the projection portion (locked portions 38) of the drive plate 31 is guided by the guide portion 48 of the spring retaining member 40 and is locked with the locking portion 47. On the other side in the circumferential direction of the projection portion (locked portion 38) of the drive plate 31, an opening 39 is formed so as to avoid interference with the guide portion 48 of the spring retaining member 40.

Figure 13A:
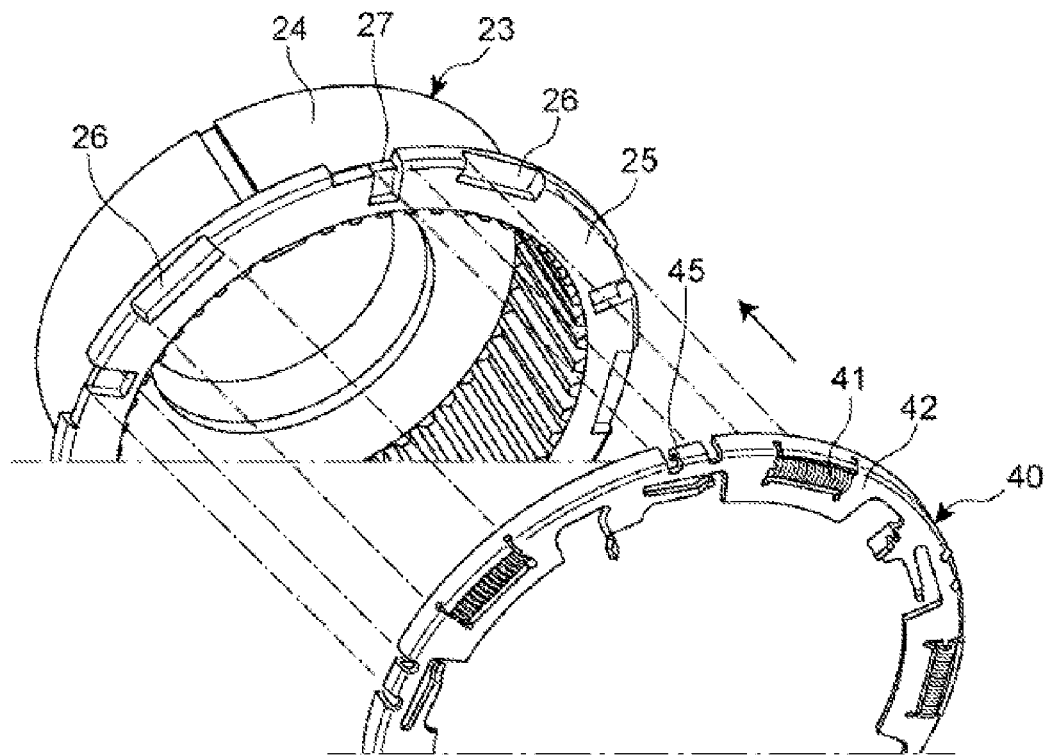
FIGS. 13A and 13B are explanatory diagrams for explaining mounting of the spring retaining member on the rotor support member.
Figure 13B:
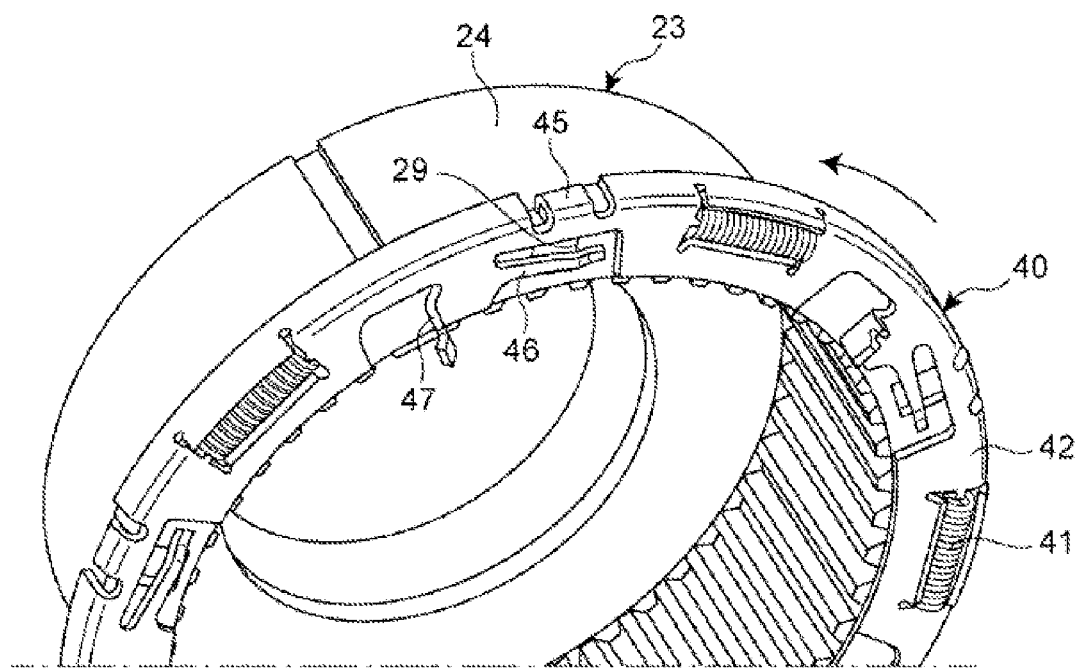

FIGS. 13A and 13B are explanatory diagrams for explaining mounting of the spring retaining member 40 on the rotor support member 23. First, before attachment of the damper device 30 to the rotor support member 23, as illustrated in FIG. 13A, the spring retaining member 40 that retains the springs 41 is relatively moved toward the rotor support member side with respect to the rotor support member 23, and the annular body 42 of the spring retaining member 40 is combined with the flange portion 25 of the rotor support member 23. The spring retaining member 40 is combined with the rotor support member 23 such that the engaging portions 45 pass through the notch portions 27 of the rotor support member 23 and the springs 41 are accommodated in the spring accommodation portions 26.

When the spring retaining member 40 is combined with the rotor support member 23, as illustrated in FIG. 13B, the temporarily fixing portions 46 of the spring retaining member 40 are arranged further on one side in the circumferential direction of the temporarily fixed portions 29 of the rotor support member 23. Next, the spring retaining member 40 is rotated toward the other side in the circumferential direction with respect to the rotor support member 23 while compressing the springs 41.

In a case where the spring retaining member 40 is rotated toward the other side in the circumferential direction with the rotor support member 23, as illustrated in FIG. 2, when the temporarily fixing portions 46 of the spring retaining member 40 are rotated to the temporarily fixed portions 29 of the rotor support member 23, the temporarily fixing portions 46 are elastically displaced toward the rotor support member side and are temporarily fixed to the temporarily fixed portions 29, and the spring retaining member 40 is temporarily fixed to and mounted on the rotor support member 23. The springs 41 are caused to become in the first compression state where those relatively urge the spring retaining member 40 toward one side in the circumferential direction with respect to the rotor support member 23.

Further, when the spring retaining member 40 is rotated toward the other side in the circumferential direction with respect to the rotor support member 23, the distal end portions 45a of the engaging portions 45 of the spring retaining member 40 are moved to positions opposed to the engaged portions 28 of the rotor support member 23 in the axial direction.

Figure 14A:
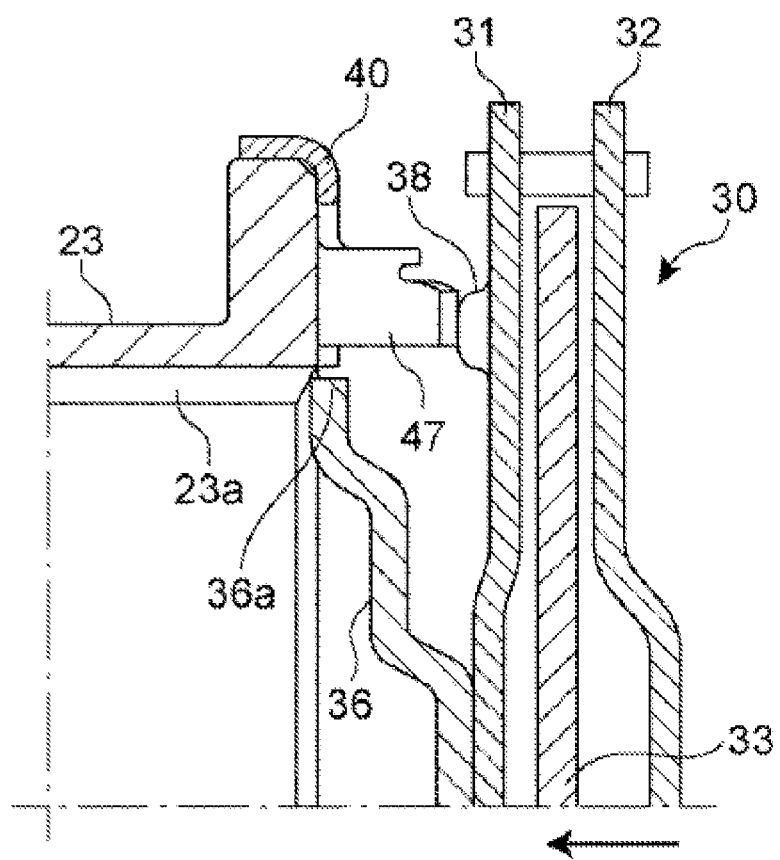
FIGS. 14A and 14B are explanatory diagrams for explaining attachment of the damper device to the rotor support member.
Figure 14B:
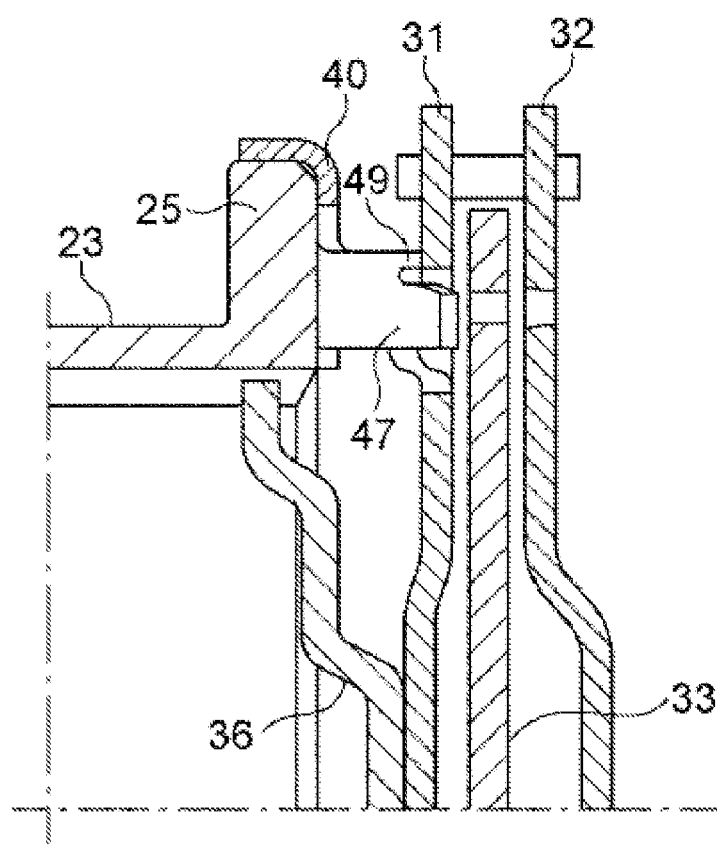
Figure 15A:
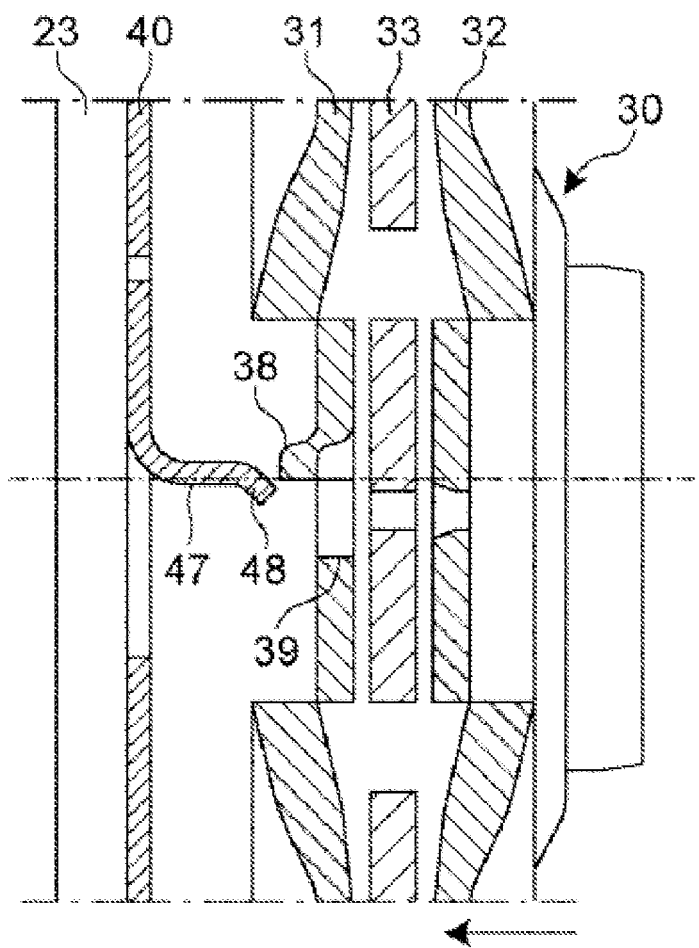
FIGS. 15A and 15B are additional explanatory diagrams for explaining attachment of the damper device to the rotor support member.
Figure 15B:
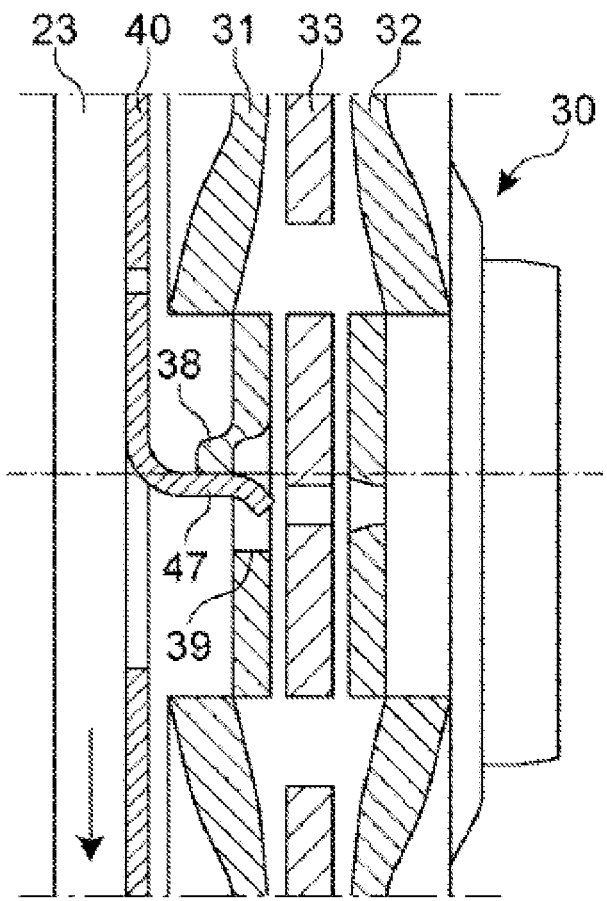
Figure 16:
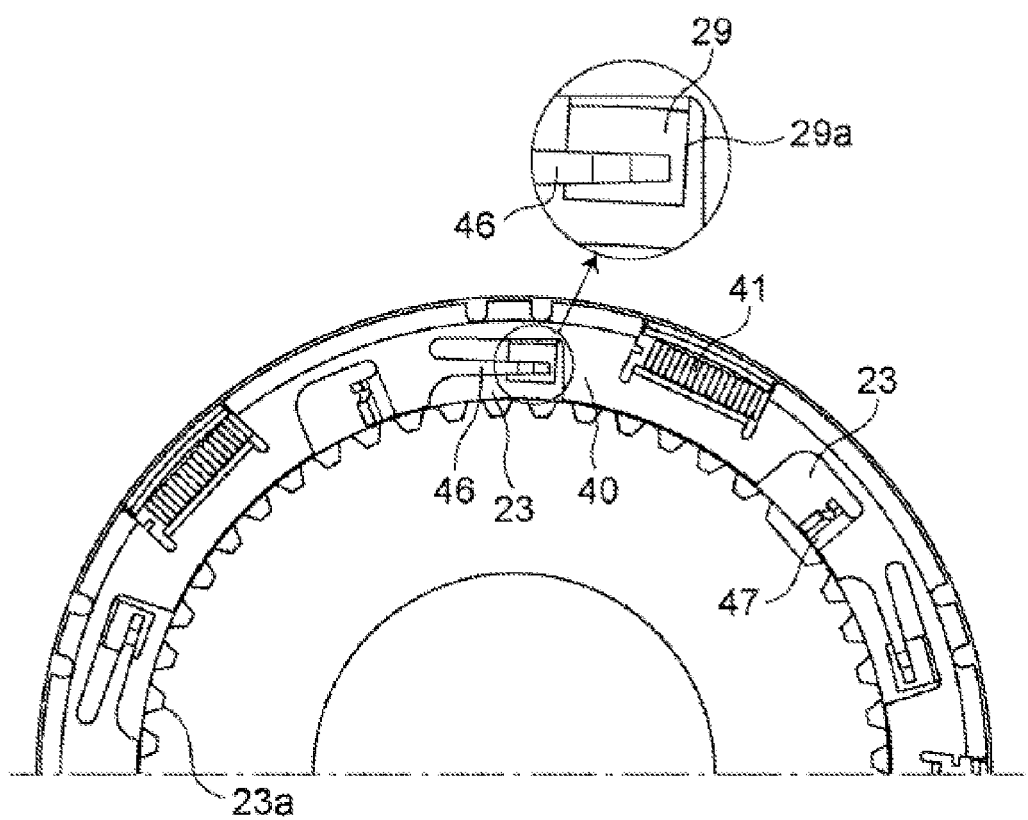
FIG. 16 is a front view illustrating the spring retaining member and the rotor support member in a case where the damper device is attached to the rotor support member.

FIGS. 14A and 14B are explanatory diagrams for explaining attachment of the damper device to the rotor support member, and FIGS. 15A and 15B are another explanatory diagrams for explaining attachment of the damper device to the rotor support member. FIG. 16 is a front view illustrating the spring retaining member and the rotor support member in a case where the damper device is attached to the rotor support member.

When the spring retaining member 40 is mounted on the rotor support member 23, the damper device 30 is attached to the rotor support member 23. When the damper device 30 is attached to the rotor support member 23, the spline portion 36a of the connecting member 36 is spline-fitted to the spline portion 23a of the rotor support member 23.

As illustrated in FIG. 14A, when the spline portion 36a of the connecting member 36 is spline-fitted to the spline portion 23a of the rotor support member 23, as illustrated in FIG. 15A, the rotor support member 23 and the connecting member 36 are spline-fitted together while the guide portions 48 of the spring retaining member 40 are arranged in the positions in which those overlap with the locked portion 38 of the drive plate 31 in the circumferential direction.

When the damper device 30 is moved toward the rotor support member side with respect to the rotor support member 23 from states illustrated in FIG. 14A and FIG. 15A, the guide portions 48 of the spring retaining member 40 contact with the projection portions (locked portions 38) of the drive plate 31, the projection portions (locked portions 38) are relatively guided toward the locking portion sides by the guide portions 48, the spring retaining member 40 is rotated toward the other side in the circumferential direction with respect to the rotor support member 23 while compressing the springs 41, and the temporary fixing between the rotor support member 23 and the spring retaining member 40 is thereby released.

The damper device 30 is further moved toward the rotor support member side with respect to the rotor support member 23, and as illustrated in FIG. 14B, the drive plate 31 is moved until it abuts the stopper portions 49 of the rotor support member 23. When the rotor support member 23 and the connecting member 36 are spline-fitted together, the spring retaining member 40 is rotated toward the other side in the circumferential direction with respect to the rotor support member 23 while further compressing the springs 41, and as illustrated in FIG. 15B, the locking portion 47 of the spring retaining member 40 are locked with the locked portion 38 of the drive plate 31.

When the locking portions 47 of the spring retaining member 40 are locked with the locked portions 38 of the drive plate 31, the springs 41 is caused to become the second compression state where those are compressed more than the first compression state and relatively urge the connecting member 36 toward one side in the circumferential direction with respect to the rotor support member 23.

The distal end portion 45a of the engaging portion 45 of the spring retaining member 40 is opposed to the engaged portion 28 of the rotor support member 23 in the first compression state and the second compression state of the springs 41.

As illustrated in FIG. 16, when the drive plate 31 is moved until it abuts the stopper portions 49 of the rotor support member 23 and the rotor support member 23 and the connecting member 36 are spline-fitted together, the circumferential-direction extended portions 46 of the spring retaining member 40 are separated from the side faces 29a of the circumferential-direction recesses 29 of the rotor support member 23, and the temporary fixing between the rotor support member 23 and the spring retaining member 40 is released.

As described above, the connecting member 36 coupled with the drive plate 31 is spline-fitted to the rotor support member 23 on which the spring retaining member 40 is mounted, and the connecting member 36 is thereby relatively urged toward one side in a rotation direction with respect to the rotor support member 23 by the springs 41.

In this embodiment, the connecting member 36 is coupled with the drive plate 31 by the rivets 37, but it is possible to use the drive plate 31 in which the drive plate 31 and the connecting member 36 are integrally formed. In this embodiment, the spring retaining member 40 is mounted on the rotor support member 23, but it is possible to mount the spring retaining member 40 on the drive plate 31.

In this embodiment, a configuration is made such that in the spline-fitting portion in which spline-fitting is made between the rotor support member 23 and the drive plate 31, specifically, the connecting member 36 coupled with the drive plate 31, the rotor support member 23 and the drive plate 31 being rotatably provided in the motive power transmission path from the drive source to drive wheels, the drive plate 31 is relatively urged toward one side in the circumferential direction with respect to the rotor support member 23; however, this embodiment is not limited to this, and can be applied to a case where the first and second motive power transmission members that are rotatably provided in the motive power transmission path from the drive source to the drive wheels are spline-fitted together.

As described above, in this embodiment, the motive power transmission device including first and second motive power transmission members that are spline-fitted together includes the spring retaining member 40 that retains the springs 41 and is mounted on the first motive power transmission member. The spring retaining member 40 includes the temporarily fixing portions 46 that are temporarily fixed to and mounted on the first motive power transmission member while the springs 41 are in the first compression state, and the first motive power transmission member is provided with the temporarily fixed portions 29. Accordingly, the spring retaining member 40 can be mounted on the first motive power transmission member by temporarily fixing the temporarily fixing portions 46 to the temporarily fixed portions 29 while the springs 41 are caused to become in the first compression state.

Further, the spring retaining member 40 includes the locking portions 47 that are locked with the second motive power transmission member in the second compression state where the springs 41 are compressed when the first and second motive power transmission members are spline-fitted together, and the second motive power transmission member is provided with the locked portions 38. Accordingly, when the second motive power transmission member is spline-fitted to the first motive power transmission member on which the spring retaining member 40 is mounted, temporary fixing between the first motive power transmission member and the spring retaining member 40 is released, the locking portions 47 of the spring retaining member 40 are locked with the locked portions 38 of the second motive power transmission member, the second motive power transmission member is urged toward one side in a rotation direction with respect to the first motive power transmission member by the springs 41, and the gear rattle sound between the first and second motive power transmission members can thereby be reduced.

The spring retaining member 40 is temporarily fixed to and mounted on the first motive power transmission member, the second motive power transmission member is spline-fitted to the first motive power transmission member on which the spring retaining member 40 is mounted, the second motive power transmission member can thereby be urged toward one side in the rotation direction with respect to the first motive power transmission member, and attachment can thus be performed comparatively easily.

Consequently, in the motive power transmission device including the first and second motive power transmission members that are spline-fitted together, the gear rattle sound between the first and second motive power transmission members can be reduced with high attachability by a comparatively simple configuration without changes in shapes of the spline portions.

Further, the locking portions 47 and the locked portions 38 are provided on outer sides in the radial direction of the spline-fitting portion between the first motive power transmission member and the second motive power transmission member. Accordingly, the locking portions 47 of the spring retaining member 40 and the locked portions 38 of the second motive power transmission member have large dimensions in the radial direction compared to a case where those are provided on inner sides in the radial direction of the spline-fitting portion, and loads can thereby be made small that act on the locking portions 47 and the locked portions 38 when the spring retaining member 40 and the second motive power transmission member are locked together.

Further, the spring retaining member 40 includes the engaging portions 45 that are engaged with the first motive power transmission member in the first and second compression states of the springs 41 and regulate movement in the axial direction toward the opposite side to the first motive power transmission member side. Accordingly, the spring retaining member 40 temporarily fixed to and mounted on the first motive power transmission member can be inhibited from moving toward the opposite side to the first motive power transmission member side and from being detached from the first motive power transmission member.

Further, the first motive power transmission member is the motor 20 as the drive source, and the second motive power transmission member is the damper device 30 connected with the motor 20. Accordingly, in a case where a first configuration member of the motor 20 and a second configuration member of the damper device 30, specifically, the connecting member 36 coupled with the second configuration member are spline-fitted together, the gear rattle sound between the first configuration member of the motor 20 and the second configuration member of the damper device 30 can be reduced with high attachability.

Further, the motor 20 includes the rotor support member 23 supporting the rotor 22, the rotor support member 23 is provided with the temporarily fixed portions 29, and the spring retaining member 40 is mounted on the rotor support member 23. Accordingly, the spring retaining member 40 can be temporarily fixed to and mounted on the rotor support member 23 comparatively easily.

Further, the temporarily fixing portion 46 is composed of the circumferential-direction extended portion (temporarily fixing portion 46) extending from the annular body 42 of the spring retaining member 40 toward one side in the circumferential direction in a cantilever shape, and the temporarily fixed portion 29 is composed of the circumferential-direction recess recessed from the spring retaining member side toward the opposite side to the spring retaining member side and extending in the circumferential direction. Accordingly, without using the spline portions 23a and 36a of the first and second motive power transmission members 23 and 31 and by a comparatively simple configuration, the circumferential-direction extended portions 46 are temporarily fixed to the circumferential-direction recesses 29 while the springs 41 are caused to become in the first compression state, and the spring retaining member 40 can thereby be mounted on the first motive power transmission member.

Further, the locking portion 47 is composed of the axial-direction extended portion 47 extending from the annular body 42 of the spring retaining member 40 toward the second motive power transmission member side in the axial direction, and the locked portion 38 is composed of the projection portion projecting toward the first motive power transmission member side in the axial direction. Accordingly, without using the spline portions 23a and 36a of the first and second motive power transmission members and by a comparatively simple configuration, the axial-direction extended portion 47 of the spring retaining member 40 is locked with the projection portions (locked portions 38) of the second motive power transmission member while the springs 41 are caused to become the second compression state, and the second motive power transmission member can thereby be urged toward one side in the rotation direction with respect to the first motive power transmission member.

Further, the locking portion 47 includes the guide portion 48 that guides the locking portion 47 to be locked with the locked portion 38. Accordingly, the locking portion 47 of the spring retaining member 40 can comparatively easily be locked with the locked portion 38 of the second motive power transmission member by the guide portion 48.

The present invention is not limited to the exemplified embodiment, but various improvements and changes in design are possible without departing from the scope of the gist of the present invention.

INDUSTRIAL APPLICABILITY

As described in the foregoing, the present invention is capable of reducing gear rattle sound between first and second motive power transmission members with high attachability by a comparatively simple configuration without changes in shapes of spline portions and is thus possibly suitably used in a vehicle in which a motive power transmission device including the first and second motive power transmission members that are spline-fitted together is installed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTERS LIST 1 automatic transmission
2 drive unit
20 motor
22 rotor
23 rotor support member
25 flange portion
29 temporarily fixed portion
30 damper device
31 drive plate
34 spring
36 connecting member
38 locked portion
40 spring retaining member
41 spring
42 annular body
45 engaging portion
46 temporarily fixing portion
47 locking portion
48 guide portion

The invention claimed is:

1. A motive power transmission device comprising:
a first motive power transmission member and a second motive power transmission member being rotatably provided in a motive power transmission path from a drive source to a drive wheel and being spline-fitted together; and
a spring retaining member that retains a spring for urging the second motive power transmission member toward one side in a circumferential direction with respect to the first motive power transmission member and is mounted on the first motive power transmission member, wherein
the spring retaining member includes:
 a temporarily fixing portion that is temporarily fixed to and mounted on the first motive power transmission member in a first compression state where the spring urges the spring retaining member toward the one side in the circumferential direction with respect to the first motive power transmission member; and
 a locking portion that is locked with the second motive power transmission member in a second compression state where when the first motive power transmission member and the second motive power transmission member are spline-fitted together, the spring is compressed more than the first compression state and urges the second motive power transmission member toward the one side in the circumferential direction with respect to the first motive power transmission member,
the first motive power transmission member is provided with a temporarily fixed portion that is temporarily fixed to the temporarily fixing portion,
the second motive power transmission member is provided with a locked portion that is locked with the locking portion, and
the temporary fixing between the first motive power transmission member and the spring retaining member is released, when the second motive power transmission member is spline-fitted to the first motive power transmission member.

2. The motive power transmission device according to claim 1, wherein the locking portion and the locked portion are provided on outer sides in a radial direction of a spline-fitting portion between the first motive power transmission member and the second motive power transmission member.

3. The motive power transmission device according to claim 2, wherein the spring retaining member includes an engaging portion that is engaged with the first motive power transmission member in the first compression state and the second compression state of the spring and regulates movement in an axial direction toward an opposite side to a first motive power transmission member side.

4. The motive power transmission device according to claim 3, wherein
the first motive power transmission member is a motor as the drive source, and
the second motive power transmission member is a damper device connected with the motor.

5. The motive power transmission device according to claim 4, wherein
the motor includes a rotor support member supporting a rotor,
the rotor support member is provided with the temporarily fixed portion, and
the spring retaining member is mounted on the rotor support member.

6. The motive power transmission device according to claim 5, wherein
the spring retaining member includes an annular body that retains the spring and is formed into an annular shape,
the temporarily fixing portion is composed of a circumferential-direction extended portion extending from the annular body toward the one side in the circumferential direction in a cantilever shape, and
the temporarily fixed portion is composed of a circumferential-direction recess being recessed from a spring retaining member side of the first motive power transmission member toward an opposite side to the spring retaining member side and extending in the circumferential direction.

7. The motive power transmission device according to claim 6, wherein
the locking portion is composed of an axial-direction extended portion extending from the annular body toward a second motive power transmission member side in an axial direction, and
the locked portion is composed of a projection portion projecting toward a first motive power transmission member side in the axial direction.

8. The motive power transmission device according to claim 7, wherein the locking portion includes a guide portion that guides the locking portion to be locked with the locked portion.

9. The motive power transmission device according to claim 4, wherein
the spring retaining member includes an annular body that retains the spring and is formed into an annular shape, the temporarily fixing portion is composed of a circumferential-direction extended portion extending from the annular body toward one side in a circumferential direction in a cantilever shape, and the temporarily fixed portion is composed of a circumferential-direction recess being recessed from a spring retaining member side of the first motive power transmission member toward an opposite side to the spring retaining member side and extending in the circumferential direction.

10. The motive power transmission device according to claim 3, wherein
the spring retaining member includes an annular body that retains the spring and is formed into an annular shape,
the temporarily fixing portion is composed of a circumferential-direction extended portion extending from the annular body toward one side in a circumferential direction in a cantilever shape, and
the temporarily fixed portion is composed of a circumferential-direction recess being recessed from a spring retaining member side of the first motive power transmission member toward an opposite side to the spring retaining member side and extending in the circumferential direction.

11. The motive power transmission device according to claim 2, wherein
the first motive power transmission member is a motor as the drive source, and
the second motive power transmission member is a damper device connected with the motor.

12. The motive power transmission device according to claim 2, wherein
the spring retaining member includes an annular body that retains the spring and is formed into an annular shape,
the temporarily fixing portion is composed of a circumferential-direction extended portion extending from the annular body toward one side in a circumferential direction in a cantilever shape, and
the temporarily fixed portion is composed of a circumferential-direction recess being recessed from a spring retaining member side of the first motive power transmission member toward an opposite side to the spring retaining member side and extending in the circumferential direction.

13. The motive power transmission device according to claim 1, wherein
the spring retaining member includes an annular body that retains the spring and is formed into an annular shape,
the temporarily fixing portion is composed of a circumferential-direction extended portion extending from the annular body toward one side in a circumferential direction in a cantilever shape, and
the temporarily fixed portion is composed of a circumferential-direction recess being recessed from a spring retaining member side of the first motive power transmission member toward an opposite side to the spring retaining member side and extending in the circumferential direction.

14. The motive power transmission device according to claim 13, wherein
the locking portion is composed of an axial-direction extended portion extending from the annular body toward a second motive power transmission member side in an axial direction, and
the locked portion is composed of a projection portion projecting toward a first motive power transmission member side in the axial direction.

15. A motive power transmission device comprising:
a first motive power transmission member and a second motive power transmission member being rotatably provided in a motive power transmission path from a drive source to a drive wheel and being spline-fitted together; and
a spring retaining member that retains a spring for urging the second motive power transmission member toward one side in a circumferential direction with respect to the first motive power transmission member and is mounted on the first motive power transmission member, wherein
the spring retaining member includes:
a temporarily fixing portion that is temporarily fixed to and mounted on the first motive power transmission member in a first compression state where the spring urges the spring retaining member toward the one side in the circumferential direction with respect to the first motive power transmission member; and
a locking portion that is locked with the second motive power transmission member in a second compression state where when the first motive power transmission member and the second motive power transmission member are spline-fitted together, the spring is compressed more than the first compression state and urges the second motive power transmission member toward the one side in the circumferential direction with respect to the first motive power transmission member,
the first motive power transmission member is provided with a temporarily fixed portion that is temporarily fixed to the temporarily fixing portion,
the second motive power transmission member is provided with a locked portion that is locked with the locking portion, and
the spring retaining member includes an engaging portion that is engaged with the first motive power transmission member in the first compression state and the second compression state of the spring and regulates movement in an axial direction toward an opposite side to a first motive power transmission member side.

16. The motive power transmission device according to claim 15, wherein
the first motive power transmission member is a motor as the drive source, and
the second motive power transmission member is a damper device connected with the motor.

17. The motive power transmission device according to claim 15, wherein
the spring retaining member includes an annular body that retains the spring and is formed into an annular shape,
the temporarily fixing portion is composed of a circumferential-direction extended portion extending from the annular body toward one side in a circumferential direction in a cantilever shape, and
the temporarily fixed portion is composed of a circumferential-direction recess being recessed from a spring retaining member side of the first motive power transmission member toward an opposite side to the spring retaining member side and extending in the circumferential direction.

18. A motive power transmission device comprising:
a first motive power transmission member and a second motive power transmission member being rotatable provided in a motive power transmission path from a drive source to a drive wheel and being spline-fitted together; and a spring retaining member that retains a spring for urging the second motive power transmission member toward one side in a circumferential direction with respect to the first motive power transmission member and is mounted on the first motive power transmission member, wherein the spring retaining member includes:
- a temporarily fixing portion that is temporarily fixed to and mounted on the first motive power transmission member in a first compression state where the spring urges the spring retaining member toward the one side in the circumferential direction with respect to the first motive power transmission member; and
- a locking portion that is locked with the second motive power transmission member in a second compression state where when the first motive power transmission member and the second motive power transmission member are spline-fitted together, the spring is compressed more than the first compression state and urges the second motive power transmission member toward the one side in the circumferential direction with respect to the first motive power transmission member, the first motive power transmission member is provided with a temporarily fixed portion that is temporarily fixed to the temporarily fixing portion, the second motive power transmission member is provided with a locked portion that is locked with the locking portion, the first motive power transmission member is a motor as the drive source, and the second motive power transmission member is a damper device connected with the motor.

19. The motive power transmission device according to claim 18, wherein the motor includes a rotor support member supporting a rotor, the rotor support member is provided with the temporarily fixed portion, and the spring retaining member is mounted on the rotor support member.

20. The motive power transmission device according to claim 18, wherein the spring retaining member includes an annular body that retains the spring and is formed into an annular shape, the temporarily fixing portion is composed of a circumferential-direction extended portion extending from the annular body toward one side in a circumferential direction in a cantilever shape, and the temporarily fixed portion is composed of a circumferential-direction recess being recessed from a spring retaining member side of the first motive power transmission member toward an opposite side to the spring retaining member side and extending in the circumferential direction.

* * * * *